Aug. 9, 1955 L. H. KELLY 2,715,192

TRANSDUCER

Filed Dec. 3, 1953

United States Patent Office 2,715,192
Patented Aug. 9, 1955

2,715,192

TRANSDUCER

Lawrence H. Kelly, Orange, N. J., assignor to American District Telegraph Company, Jersey City, N. J., a corporation of New Jersey Application December 3, 1953, Serial No. 395,893

8 Claims. (Cl. 310—26)

My present invention relates to electro-mechanical transducers, and more particularly to transducers capable of converting electric energy into acoustic energy, especially at an ultra-sonic frequency, and vice-versa.

In the application of L. A. MacDonald and myself filed October 19, 1953, Serial Number 386,862, and assigned to the assignee of my present application, there is set forth and claimed a transducer especially suitable for detecting unauthorized activity in a protected area. Usually two such transducers are employed. One, the transmitter, is coupled to a fixed oscillator which generates an alternating current having a predetermined frequency preferably just above the audible range. This current induces elongation and contraction of a magnetostrictive rod immersed in the field associated with the current and also subjected to a steady magnetic field. Resonant elements fixed with the rod and vibrated thereby at the ultra-sonic frequency generate vibrations which "flood" the protected area. The other transducer is utilized as a receiver and is coupled to an alarm circuit. So long as the receiver is subjected to vibrations at the frequency generated by the transmitter, the receiver converts this vibrational energy into electrical energy of the predetermined frequency and the alarm circuit is maintained in a deenergized or other desired condition signaling the security of the protected area. Because of the Doppler effect, any substantial movement within the area causes a variation in the frequency of the vibrational energy detected by the receiving transducer. This in turn leads to the generation of electrical energy having a frequency different from the predetermined frequency generated by the transmitting transducer and the alarm circuit is energized to signal the occurrence of the movement.

It is important to efficient functioning of such apparatus that the protected area be effectively filled or flooded with the desired vibrational energy. I have found that the efficiency of such transducers may be markedly increased so as to render the same not only more effective in converting electrical energy into vibrational energy at the desired frequency, but also more effective in detecting and converting vibrational energy into electrical energy corresponding in frequency to the frequency of the vibrations detected.

It is, therefore, a principal object of my invention to provide an electro-mechanical transducer of compact yet simple construction having improved sensitivity and efficiency.

A more specific object is to provide such a transducer in which a magnetostrictive rod is mounted so as to avoid damping of the magnetostriction effect.

In a preferred embodiment of my invention I provide a magnetostrictive rod to one end of which is rigidly attached a resonant element in the form of a cylindrical tube which is resonant at a desired frequency. The rod is mounted so as to form a magnetic circuit element for the flux from a permanent magnet. The mounting elements which form the sole connection between the rod and its support are resilient and chosen so that the rod is in effect floated within a coil form on the outer surface of which a single layer coil winding is located. Preferably the coil, magnet and all but the end of the magnetostrictive rod attached to the resonant element are encased in a compact housing.

Additional objects as well as advantages of my invention will be apparent from the following description and the drawing in which.

Figure 1:
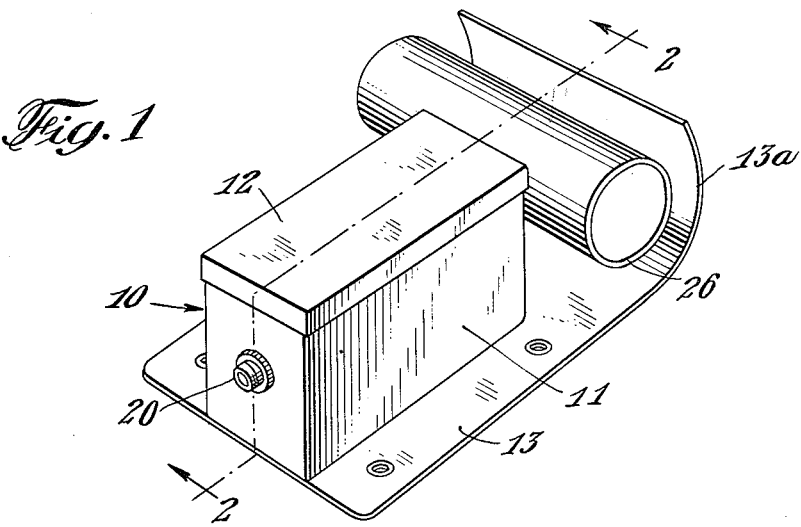
Figure 1 is a perspective view of an electro-mechanical transducer constructed in accordance with my invention.
Figure 2:
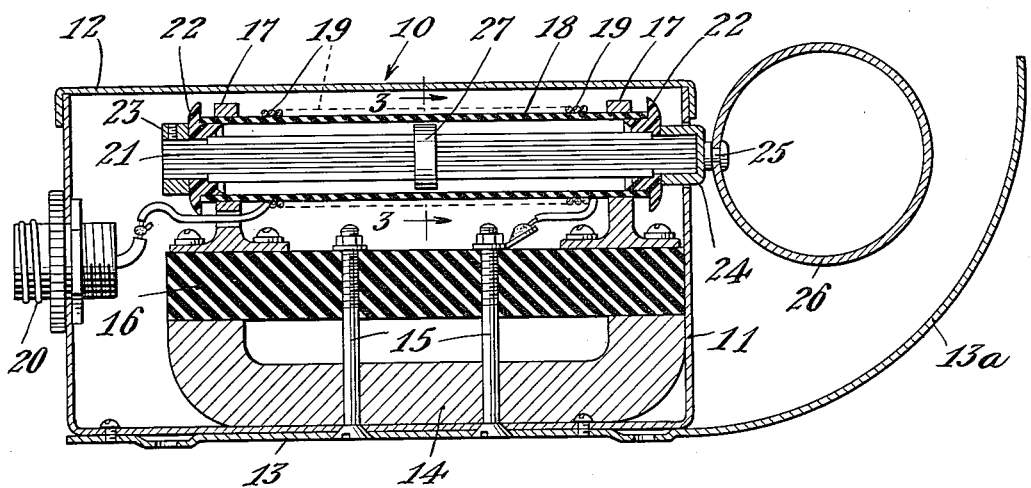
Figure 2 is a sectional view thereof along the line 2—2 of Figure 1 on an enlarged scale.

Referring now to the drawing in detail, transducer 10 has a housing 11 which may be in the form of a box, as shown, with a detachable lid 12. Connected to what may be termed the base of housing 11 in a reflector 13 having an arcuate portion 13a. Within housing 11 is a permanent magnet 14 which, as shown, is in the form of a bar with the ends thereof turned to form a shallow U-shaped member. Magnet 14 is drilled, as indicated, and a pair of bolts 15 extend therethrough and serve to rigidly attach to the turned ends thereof an insulative mounting block or member 16, as well as to affix magnet 14 to housing 11. It is to be noted that mounting block 16 is preferably dimensioned so as to establish the proper spacing between magnet 14 and a magnetostrictive rod 21. Adjacent each of the ends of insulative mounting block 16 there is rigidly mounted a mounting bracket or support member 17. Each of the brackets 17 embraces an end portion of a coil spool or form 18 made of suitable insulating material, such as polystyrene. A single layer wire coil 19 is wound on form 18 between brackets 17, thereby forming a tubular wound coil assembly. One end of coil 19 is connected to a suitable connector 20 mounted in an opening provided in one of the walls of housing 11, as shown. The other end of coil 19 is connected to ground and this is conveniently accomplished in the present instance by means of a lug clamped to one of the bolts 15. Thus, the ground connection is through the bolt 15 and housing 11 to the outside of connector 20 which is in turn connected to a grounded cable sheath (not shown).

Figure 3:
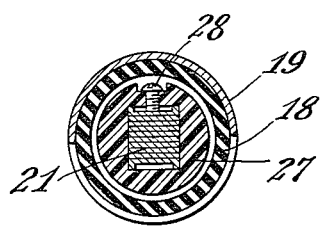
Figure 3 is a sectional view on an enlarged scale along the line 3—3 of Figure 2.

Magnetostrictive rod 21 is mounted within coil form 18 but out of binding contact with the coil form. To this end, resilient means are provided which support rod 21 close to but out of contact with coil form 18. Rod 21 may be constructed as described in said copending application. Preferably, rod 21 comprises a plurality of nickel laminations which are separated by sheets of waxed cloth or other suitable insulating material. As shown in Figure 3, the outer laminations are channel-shaped to minimize the transverse magnetostriction effect and transverse bending of rod 21. The end portions of rod 21 are bonded to form a solid member, as by soldering or the like. An insulating bushing 27 engirdles the electrical center of rod 21 which is a nodal point and by means of set screw 28 serves to clamp the laminations at this point. Resilient collar-like bushings or grommets 22 each having flexible outwardly extending flanges resiliently engage rod 21 adjacent the ends thereof and serve to seat rod 21 within coil form 18 so that rod 21 in effect is free to float within the form, grommets 22 being spaced along rod 21 a sufficient distance so as to engage the ends of form 18. One end of rod 21 may carry an insulating retainer 23. The other end of rod 21 is bonded to a cup-shaped member 24 which extends through an opening provided in housing 11 and aligned therewith. Cup-shaped member 24 facilitates mounting the end of rod 21 therein and bonding material such as a solder or other suitable material is used to fill the space between the arcuate inner surface of member 24 and rod 21 to provide a large area metal to metal contact between rod 21 and cup-shaped member 24. The base of cup-shaped member 24 has an outwardly extending pin 25 which extends through an aperture formed in resonator element 26 and is upset, as shown, to rigidly affix element 26 to that end of rod 21. Resonator element 26 is preferably cylindrical and has a relatively large diameter. A lightweight alloy or metal such as aluminum is utilized in forming element 26 and the dimensions thereof are chosen so that its fundamental frequency of vibration coincides with the frequency of the alternating current supplied to coil 19 in the case of a transmitter or to the fundamental frequency received from another transducer in the case of a receiver. It is contemplated that the fundamental frequency will be predetermined, as will be more fully described hereinbelow.

The transmitting transducer operates on the known magnetostriction principle that, when a ferromagnetic member is placed in a varying magnetic field, certain changes occur in its internal structure resulting in small changes in its physical dimensions. The receiving transducer operates on the converse thereof. When the member in the presence of a magnetic field is subjected to external stress, its degree of magnetization is altered and a voltage is induced which may be detected and amplified. In practice, rod 21 is subjected to the varying magnetic field associated with the alternating current flowing in coil 19 in the case of a transmitting transducer. The current is supplied by an oscillator having a predetermined frequency chosen to coincide with the natural resonant frequency of rod 21. This is the case since rod 21 vibrates most strongly at this frequency and most efficient operation of the system is thereby facilitated. Since rod 21 is subjected to induced magnetic flux on both the positive and negative excursions of the applied electrical wave, permanent magnet 14 is provided to bias rod 21 magnetically so that the induced magnetic field does not exceed the bias field, otherwise rod 21 may vibrate at twice the frequency of the applied electrical wave.

The length of magnetostrictive rod 21 is selected so that it is resonant at the desired frequency of operation. The length of rod 21 is determined from the known fact that the length of a magnetostrictive member which is resonant at a given frequency is equal to the speed of sound or ultrasonic waves in said member divided by one-half the desired frequency. It is apparent that the length of the member decreases with increasing frequency and this serves as a practical upper limit to the frequency of operation. In practice, rod 21 is made slightly less than the resonant length so that the rod together with resonator 26 forms a resonant system at the operating frequency. Other considerations such as the temperature range over which the rod 21 will be operated must also be taken into account, as is well known.

When transducer 10 is operated either as a transmitter or receiver, rod 21 is free to elongate and contract in response to the varying induced magnetic field or in response to the varying external stress applied thereto by the ultra-sonic vibrations impinging on resonator 26 which in turn varies the effect of the biasing magnetic field. Since rod 21 is floating by reason of the resilient support formed by grommets 22, there is substantially no damping of the longitudinal vibratory motion of rod 21. Furthermore, the manner in which rod 21 is mounted furnishes another important advantage in that distortion introduced heretofore by the magnetostrictive element is substantially reduced or eliminated. This results in part from the fact that while insulating bushing 27 clamps the laminations of rod 21, the insulating bushing 27 is not fixed but is free to move with rod 21 as the nodal point may drift somewhat with a change in wavelength or other uncontrollable effect.

Of course, other materials than those set forth herein may be utilized without departing from my invention. For example, while nickel which has a negative magnetostrictive coefficient has been selected as the ferromagnetic material, there are others which may also be used, including those which have a positive coefficient. Furthermore, it is intended to include within my invention those equivalents which are within the scope of the claims.

What I claim is:

1. An electro-mechanical transducer, comprising an elongated hollow coil, an elongated magnetostrictive member extending within said coil and having one end projecting therefrom, resilient means forming the sole support for said magnetostrictive member connected directly thereto and supporting the same close to but out of contact with said coil, and a resonant member fixed to said one end of the magnetostrictive member and movable therewith.

2. An electro-mechanical transducer for operation about a predetermined frequency, comprising an elongated hollow insulating coil form, a wire winding on said coil form intermediate the ends thereof, an elongated magnetostrictive member extending within said coil, resilient members adjacent each end of said magnetostrictive member and engaging each end portion of said coil form, said resilient members forming the sole support for said magnetostrictive member and directly supporting the same free to move longitudinally with respect to said coil form, and an elongated resonant member fixed to one end of the magnetostrictive member and resonant therewith at said predetermined frequency.

3. An electro-mechanical transducer for operation about a predetermined frequency, comprising a tubular wound coil assembly, an elongated magnetostrictive rod extending within said coil assembly and substantially coaxial therewith, a pair of resilient members each directly engaging said rod adjacent one end thereof and also directly engaging said coil assembly, said resilient members supporting said rod within said coil assembly with the rod out of contact with said coil assembly, an insulating bushing engirdling said rod substantially at the center thereof, said bushing being free to move with said rod and said resilient members forming the sole support for said rod and maintaining the same free to move axially with respect to said coil assembly, and an elongated resonator fixed to one end of said rod and resonant therewith at said predetermined frequency.

4. An electro-mechanical transducer for operation about a predetermined frequency, comprising a tubular insulative coil form, a wire wound coil on said form, an elongated magnetostrictive rod extending within said coil form and substantially coaxial therewith, a pair of apertured resilient insulative grommets each having its inner surface engaging said rod adjacent one end thereof and its outer surface engaging the inner surface of said coil form and thereby supporting said rod in close spaced apart relation with the coil form and free to move axially with respect thereto, an insulative bushing engirdling said rod substantially at the center thereof, said bushing being free to move with said rod, said grommets forming the sole support for said rod in said coil form, and a resonator fixed to one end of said rod and resonant therewith at said predetermined frequency.

5. An electro-mechanical transducer for operation about a predetermined frequency, comprising a tubular insulative coil form, a wire wound coil on said form, an elongated magnetostrictive rod extending within said coil form and substantially coaxial therewith, a pair of apertured resilient insulative grommets each having its inner surface engaging said rod adjacent one end thereof and its outer surface engaging the inner surface of said coil form and thereby supporting said rod in close spaced apart relation with the coil form and free to move axially with respect thereto, said grommets forming the sole support for said rod, a housing, support means fixed to said coil form and supporting the coil form with the rod supported therein within said housing, said housing having an aperture formed in a wall thereof in alignment with one end of said rod, a resonator outside of said housing, and means extending through said aperture and rigidly connecting said one end of the rod to said resonator, said rod and resonator being resonant at said predetermined frequency.

6. An electro-mechanical transducer for operation about a predetermined frequency, comprising a tubular insulative coil form, a wire wound coil on said form, an elongated magnetostrictive rod extending within said coil form and substantially coaxial therewith, a pair of apertured resilient insulative grommets each having its inner surface engaging said rod adjacent one end thereof and its outer surface engaging the inner surface of said coil form and thereby supporting said rod in close spaced apart relation with the coil form and free to move axially with respect thereto, an insulative bushing engirdling said rod substantially at the center thereof, said bushing being free to move with said rod, said grommets forming the sole support for said rod in said coil form, a housing, magnetic biasing means mounted in said housing and connected thereto, coil form support means connected to said magnetic biasing means and to said coil form, said housing having an aperture formed in a wall thereof in alignment with one end of said rod, a tubular resonator outside of said housing, and means extending through said aperture and rigidly connecting said one end of said rod to said resonator, said rod and resonator being resonant at said predetermined frequency.

7. An electro-mechanical transducer for operation about a predetermined frequency, comprising a tubular insulative coil form, a wire wound coil on said form, an elongated magnetostrictive rod extending within said coil form and substantially coaxial therewith, a pair of apertured resilient insulative grommets each having its inner surface engaging said rod adjacent one end thereof and its outer surface engaging the inner surface of said coil form and thereby supporting said rod in close spaced apart relation with the coil form and free to move axially with respect thereto, an insulative bushing engirdling said rod substantially at the center thereof, said bushing being free to move with said rod, said grommets forming the sole support for said rod in said coil form, a housing, magnetic biasing means mounted in said housing and connected thereto, an insulative non-magnetic spacing and mounting member fixed to said magnetic biasing means, coil form support means connected to said spacing and mounting member and to said coil form, said housing having an aperture formed in a wall thereof in alignment with one end of said rod, a tubular resonator outside of said housing, and means extending through said aperture and rigidly connecting said one end of said rod to said resonator, said rod and resonator being resonant at said predetermined frequency.

8. An electro-mechanical transducer for operation about a predetermined frequency, comprising a tubular insulative coil form, a wire wound coil on said form, an elongated magnetostrictive rod extending within said coil form and substantially coaxial therewith, a pair of apertured resilient insulative grommets each having its inner surface engaging said rod adjacent one end thereof and its outer surface engaging the inner surface of said coil form and thereby supporting said rod in close spaced apart relation with the coil form and free to move axially with respect thereto, an insulative bushing engirdling said rod substantially at the center thereof, said bushing being free to move with said rod, said grommets forming the sole support for said rod in said coil form, a housing, a permanent bar-shaped magnet having upturned end portions forming a shallow U-shaped member, an insulative non-magnetic spacing and mounting member fixed to said upturned ends of said magnet, coil form support means rigidly connected to said spacing and mounting member and to said coil form, said housing having an aperture formed in a wall thereof in alignment with one end of said rod, a tubular resonator outside of said housing, and means extending through said aperture and rigidly connecting said one end of said rod to said resonator, said rod and resonator being resonant at said predetermined frequency.

References Cited in the file of this patent

UNITED STATES PATENTS

| | | |
|---|---|---|
| 1,982,341 | Hitchcock | Nov. 27, 1934 |
| 2,116,522 | Kunze | May 10, 1938 |
| 2,478,207 | Robinson | Aug. 9, 1949 |
| 2,498,990 | Fryklund | Feb. 28, 1950 |
| 2,539,535 | Espenschied | Jan. 30, 1951 |

FOREIGN PATENTS

| | | |
|---|---|---|
| 614,498 | Germany | June 11, 1935 |